(No Model.) 6 Sheets—Sheet 1.
R. POWELL.
CONSTRUCTION AND LAYING OF SUBAQUEOUS TUNNELS.
No. 485,983. Patented Nov. 8, 1892.
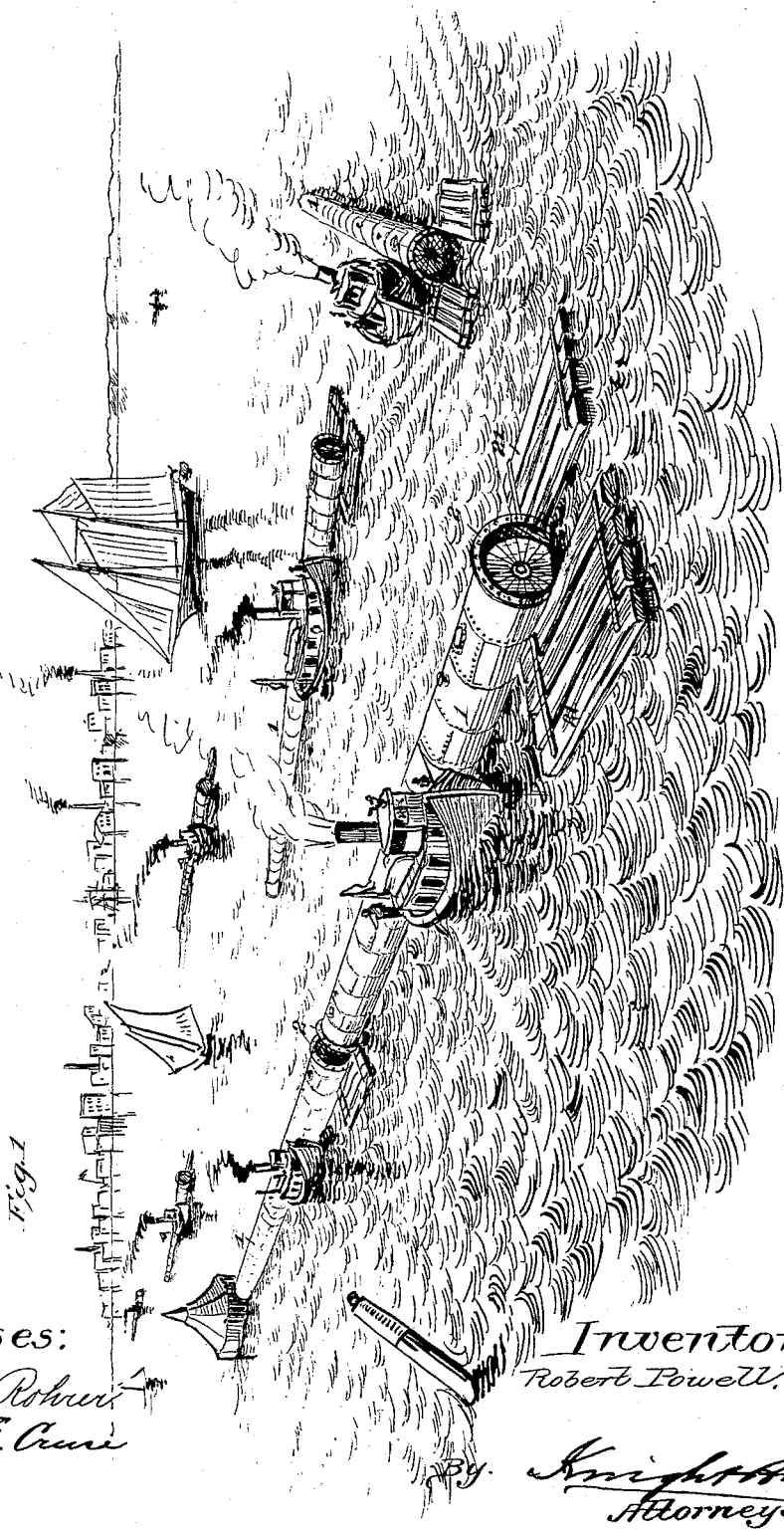

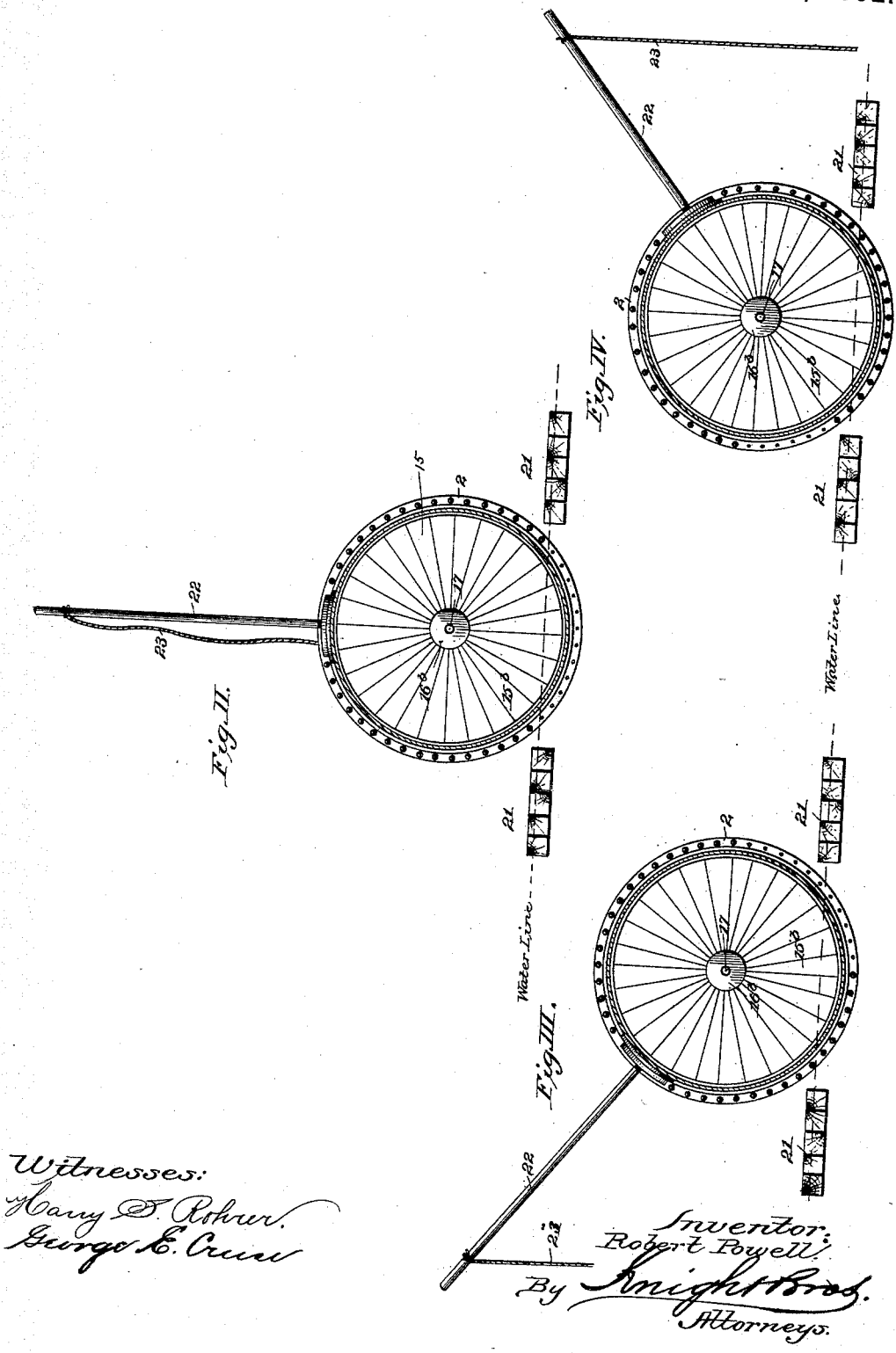

(No Model.)
R. POWELL.
CONSTRUCTION AND LAYING OF SUBAQUEOUS TUNNELS.
No. 485,983. Patented Nov. 8, 1892.
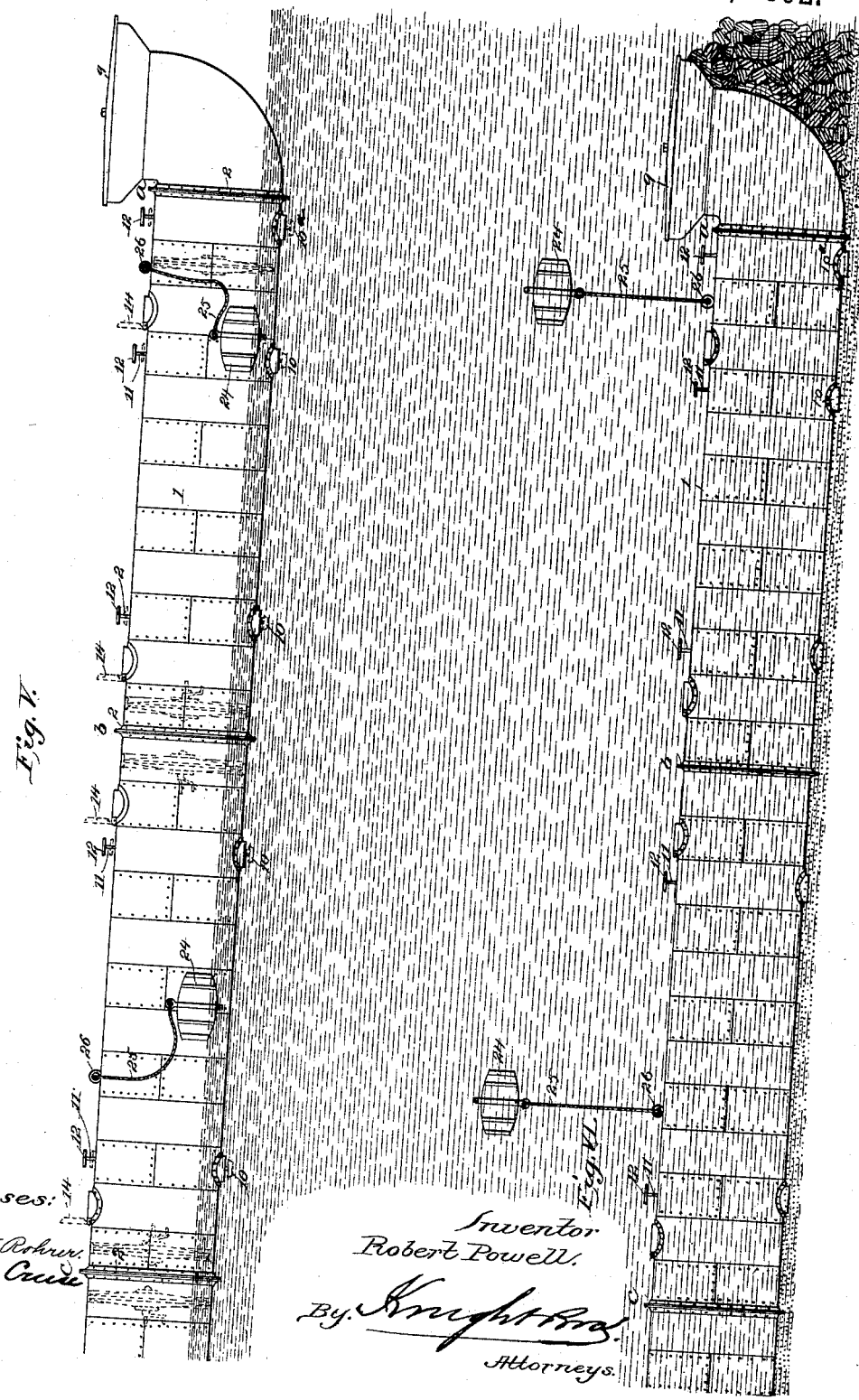

(No Model.) 6 Sheets—Sheet 4.
R. POWELL.
CONSTRUCTION AND LAYING OF SUBAQUEOUS TUNNELS.
No. 485,983. Patented Nov. 8, 1892.
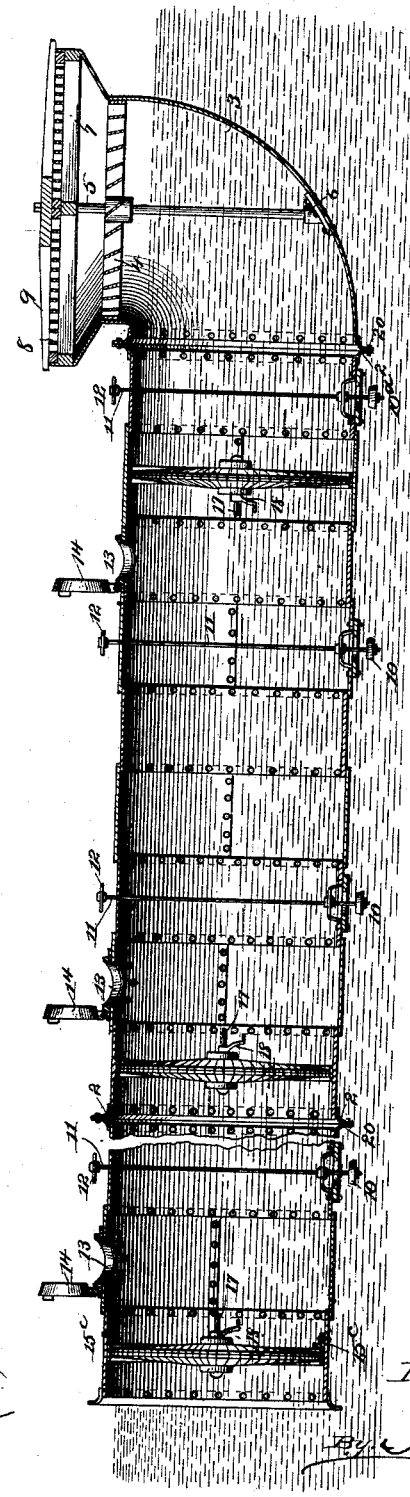
Witnesses:
Harry S. Rohrer
George E. Cruse
Inventor:
Robert Powell.
By Knight Bros
Attorneys (No Model.)
R. POWELL.
CONSTRUCTION AND LAYING OF SUBAQUEOUS TUNNELS.
No. 485,983. Patented Nov. 8, 1892.
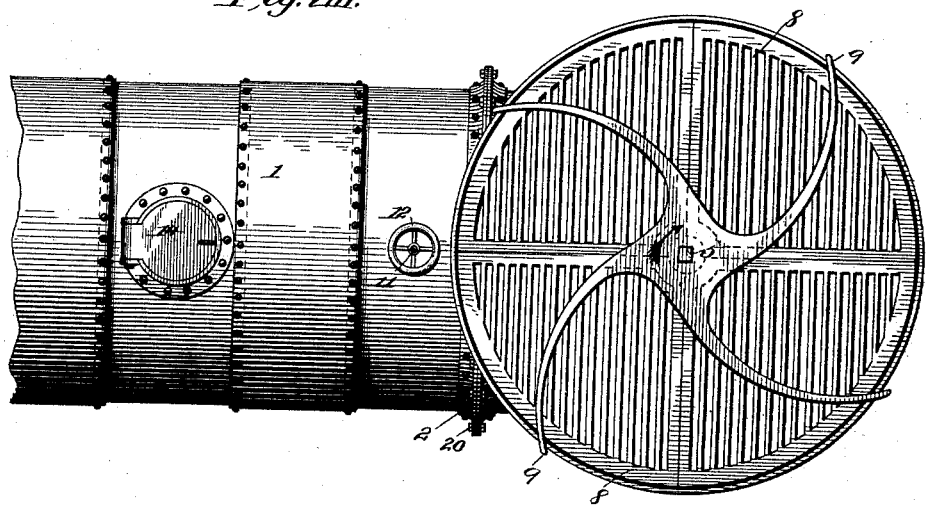
Fig. VIII.
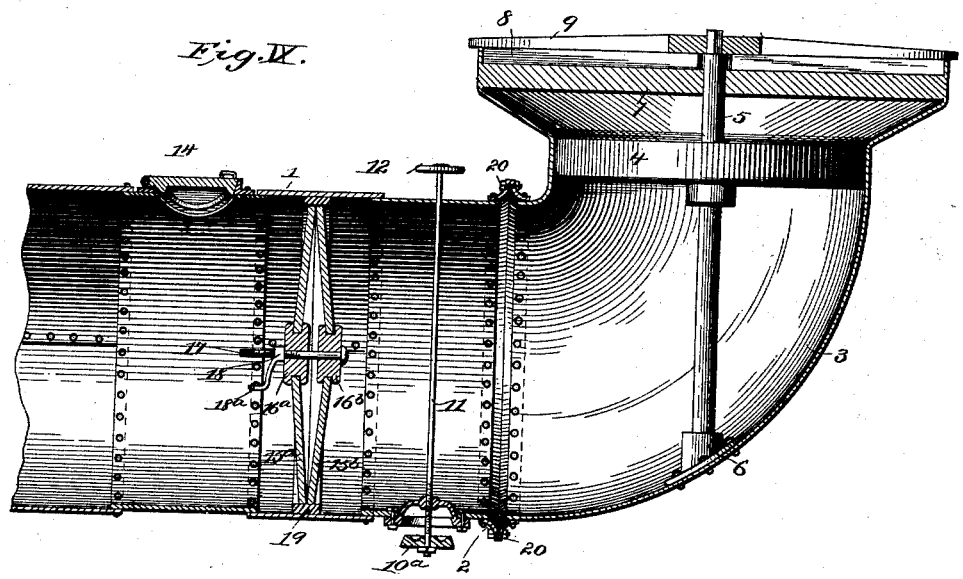
Fig. IX.
Witnesses:
Harry D. Rohrer.
George E. Cruse.
Inventor:
Robert Powell.
By Knight Bros.
Attorneys.

(No Model.) 6 Sheets—Sheet 6.
R. POWELL.
CONSTRUCTION AND LAYING OF SUBAQUEOUS TUNNELS.
No. 485,983. Patented Nov. 8, 1892.
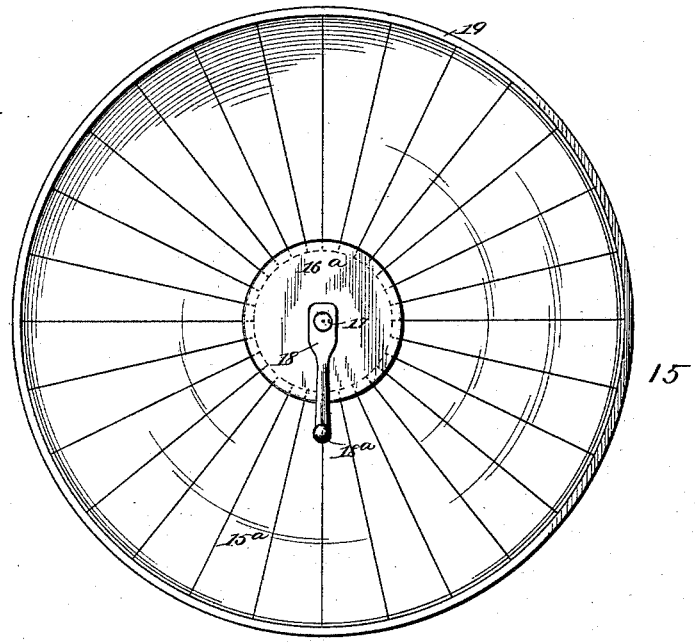
Fig. X
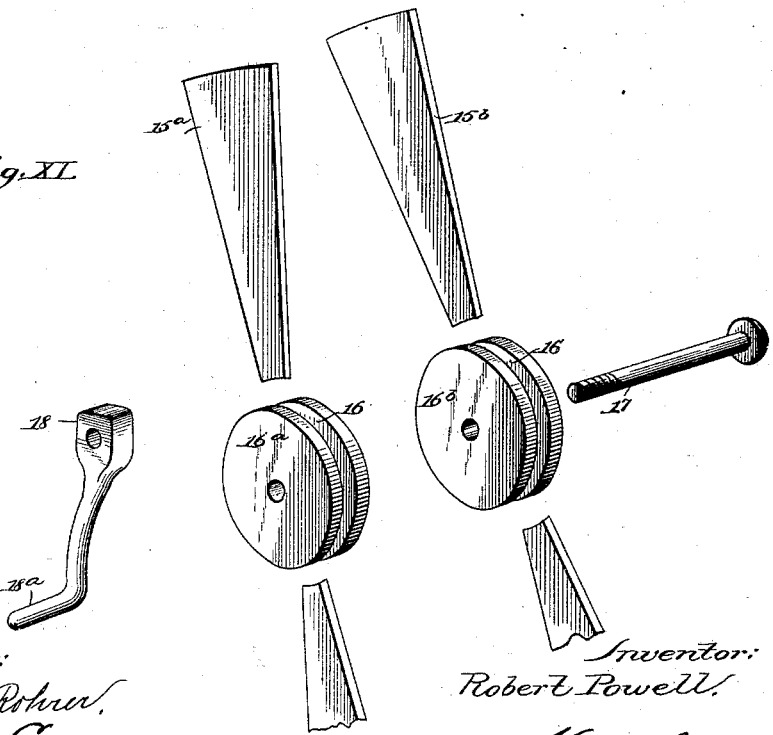
Fig. XI
Witnesses:
Harry S. Rohrer
George E. Cruse
Inventor:
Robert Powell
By Knight Bros
Attorneys.

UNITED STATES PATENT OFFICE.

ROBERT POWELL, OF CLEVELAND, OHIO.

CONSTRUCTION AND LAYING OF SUBAQUEOUS TUNNELS.

SPECIFICATION forming part of Letters Patent No. 485,983, dated November 8, 1892.

Application filed March 7, 1892. Serial No. 424,045. (No model.)

*To all whom it may concern:*

Be it known that I, ROBERT POWELL, a citizen of the United States, residing at Cleveland, in the county of Cuyahoga and State of Ohio, have invented certain new and useful Improvements in Constructing and Laying Subaqueous Tunnels, of which the following is a specification.

My invention is applicable to the construction of tunnels under water, of sufficient capacity for railroads and other roadways or for large aqueducts for supplying cities with water from lakes or rivers.

In carrying out my invention I construct tubes of steel or other metal, of any convenient length, with outturned flanges at the ends for bolting them together, and provide each section with one or more valves, preferably controlled by rods extending through to the opposite side of the tunnel and with one or more manholes in each section on the opposite side from the valve or valves. I then close the ends of the tube-sections with bulkheads, each consisting of a pair of concavo-convex heads or disks formed of radial staves, said disks being separated at the center and converging so as to meet at the periphery and being surrounded by an annular packing, so that by applying a bolt and nut at the center on the axial line the heads or disks may be forcibly drawn toward each other, causing their radial extension or pressure in all directions outwardly against the surrounding packing. It is practicable to make the tunnel-sections three hundred feet long and ten feet in diameter or of whatever capacity required for the water-main, roadway, or other use. The sections so prepared and closed and ballasted are launched on the water, and while floating on the surface are connected end to end by bolting together their end flanges. Steam-tugs or other appliances are used to tow the buoyant tunnel-sections to position, and suitable rafts are provided on each side at every place of joining for the workmen to stand on in applying the bolts. After the necessary number of bolts have been applied through the parts of the meeting flanges above the water, sweeps or levers are introduced in the manholes on top of the floating tunnel, and this is rolled over to one side sufficiently to expose at least one-half of the remaining bolt-holes, and after bolts are applied to these it is rolled in the other direction to expose the remainder and thus permit the completion of the joint. The sections having been thus united from end to end of the tube or tunnel one-half or more of the bulk-heads are removed by withdrawing the central straining-bolts, after which the staves may be separated and passed out through the manholes. If desired, all but the end bulk-heads of the entire tunnel may be thus removed before submersion. Men are then stationed at all the valves from end to end, and, all being ready, at a given signal all the valves are simultaneously opened, permitting the water to flow in from below with substantial uniformity at all points throughout the length of the tunnel, resulting in its sinking equally throughout its length until it rests on the bottom. The valves are so manipulated as to cause the tunnel to sink slow or fast and regulate the relative descent of its various parts, as required. The open manholes on top of the tunnel permit the escape of displaced air, and as soon as the tunnel is full of water the valves and all the manholes excepting the end ones are closed. Suitable buoys are connected by lines to rings on the upper side of the tunnel before sinking to cause it to settle to the bottom right side up. When the bottom is reached, divers descend through the open manholes near the ends of the tunnel and remove the remaining bulk-heads, their sectional construction in separable staves rendering this operation quite easy and rapid.

In order that my invention may be fully understood, I will proceed to describe it with reference to the accompanying drawings, in which—

Figure I is a perspective view illustrating the mode of floating the sections of the tunnel to position and uniting them preparatory to sinking. Figs. II, III, and IV are transverse sections of the tunnel on a larger scale, illustrating the mode of canting the tunnel first to one side and then to the other to complete the riveting together of the coupling-flanges. Fig. V is a side elevation showing the tunnel floating on the surface of the water in readiness for sinking. Fig. VI is a side view showing it sunk to its final position.

Fig. VII is a vertical longitudinal section showing the inlet-valves and manholes open, as when the tunnel is in course of filling to permit it to sink. Fig. VIII is a plan view of the intake end of the tunnel on a larger scale. Fig. IX is a vertical section of the same. Fig. X is an elevation of one of the separable bulkheads, also on a larger scale. Fig. XI is a perspective view of the separate parts of the same.

In practice I construct of boiler-plate or steel plates any necessary number of tubes or tunnel-sections 1, with outturned flanges 2 at their ends for coupling the sections together. The said flanges are not turned at right angles, but curved, as shown in Figs. VII and IX, in order to render them more flexible. These sections are made of caliber or capacity to suit the purpose for which they are intended and may be of sufficient size for subaqueous railways or other roadways. For the purpose of a water-main for supplying a large city with water from a lake or river the tunnel may be made ten feet or more in diameter and the sections may be conveniently made three hundred feet long. One of these tunnel-sections is represented in the drawings extending from $a$ to $b$ and another from $b$ to $c$, and so on, the proportionate length being reduced in the drawings for more convenient representation, and in Fig. VII the tunnel being broken away in its length in order to show the two tunnel ends to illustrate the mode of sinking into position, as above referred to, and as hereinafter more fully described.

For the intake end of the tunnel, where it is used as a water-main, I provide an elbow 3, in which is mounted a turbine water-wheel 4, the shaft 5 of which rests in a step 6 and has its upper bearing in a frame 7, surmounted by a sectional grating 8 to prevent the entrance of weeds, fish, drift, and other solid matter into the tunnel. The purpose of the turbine wheel 4 is to turn a rotary sweep 9, which is mounted on the upper end of the shaft 5 and turns in contact with or directly above the upper surface of the grating 8, in the direction indicated by the arrow, so as to sweep from the grating and discharge radially outward weeds and other matter which would otherwise be liable to accumulate on the grating and obstruct the inflow of water.

Each tunnel-section is provided at bottom with two or more valves 10, one of which is located near the end of each tunnel-section. These valves are operated by rods 11, extending upward and through the top, provided with hand-wheels 12 for opening and closing the valves. Near the ends of the tunnel-sections are manholes 13, and at the extremities of the tunnel-sections I apply sectional bulkheads 15, constructed as follows: Each bulkhead consists of a pair of dish-shaped disks $15^a$ $15^b$, Fig. IX, and each of these disks is made up of a series of radial staves, as shown in Figs. II, III, IV, and X and as illustrated in the detail view Fig. XI, which shows the staves separated. The radial joints between the staves may be tongue-and-grooved in the customary manner to make them tight. Their inner ends are held in circumferential grooves 16 in central hubs $16^a$ $16^b$, Figs. IX, X, and XI, which are perforated for the reception of the axial screw-bolt 17, to the threaded end of which is applied a nut 18, preferably provided with a crank-handle $18^a$ for turning it. The dish-shaped form of the disks or heads $15^a$ $15^b$, made up of radial staves and central hubs, as above explained, adapts them to converge to their common periphery, around which is applied an annular packing 19, which may be of rubber or of other suitable material. This mode of constructing bulk-heads is of great utility, as it adapts them to be applied at any desired points on the interior of a tunnel without any special provision or preparation on the interior surface. When it is necessary or desirable to resist very heavy pressures, lugs or knees may be provided on the interior surface, as illustrated at $15^c$ in Fig. VII; but this is not necessary under ordinary circumstances. A bulk-head thus constructed of two dish-shaped disks and of suitable diameter to fit easily within the tunnel is inserted near each end of each tunnel-section, and, the nut 18 being screwed up on the axial bolt 17, the hubs $16^a$ $16^b$ are drawn together, forcing the disks $15^a$ $15^b$, made up of radial staves, radially outward, so as to compress the annular packing firmly against the inside of the tunnel all around the periphery of the bulk-head, thus forming a water-tight closure in a simple and effective manner and, moreover, providing a bulk-head which can be readily removed in detached pieces when required, as hereinafter described. An additional inlet-valve $10^a$ is provided between the place of the bulk-head and the extremity of the tunnel-section, to which the intake-elbow 3 is bolted, to cause it to fill with water simultaneously with the other parts of the tunnel in the sinking operation.

Any necessary number of tunnel-sections 1 of the required length and diameter having been constructed as above described, their ends are closed with bulk-heads 15 and the valves 10 and manhole-stoppers 14 are closed. The tunnel-sections are thus rendered buoyant and adapted to float on the surface of the water. The tunnel-sections are provided with suitable ballast to adapt them to float right side up. The buoyant tunnel-sections thus prepared are launched on the surface of the lake or river and towed to position, as illustrated in Fig. I. The sections being placed end to end their outturned meeting flanges 2 2, with suitable packing interposed, are secured together by bolts 20. For this operation rafts 21 are provided for the workmen to stand upon on each side of the respective joints or couplings. The tunnel-sections being thus fastened together end to end and in a direct line by means of bolts inserted in such of the bolt-holes of the flanges 2 2 as are above the surface of the water, a sufficient number of sweeps or levers 22 are inserted in the manholes 13, and by means of ropes 23 the workmen on the rafts cant the entire tunnel to one side, as illustrated in Fig. III, until fully one-half of the unused bolt-holes are exposed above the surface of the water. Bolts are then applied in these holes, after which the entire tunnel is canted in the opposite direction, as illustrated in Fig. IV, so as to expose all of the remaining bolt-holes above the surface of the water. Bolts are then applied in these holes and the work of coupling all the tunnel-sections together end to end is completed. The tunnel is then allowed to assume its upright position under the influence of the ballast. The workmen may then enter the tunnel through the open manholes 13 and remove some of the bulk-heads, preferably all excepting the two at the extremities of the entire tunnel. The valves 10 are then gradually opened to admit water simultaneously at all points throughout the length of the tunnel and cause it to settle or sink evenly, the displaced air escaping through the open manholes. As a further means for preventing the tunnel from capsizing and causing it to sink to the bottom right side up, any necessary number of buoys 24 are provided, connected by ropes 25 with rings 26 in the top of the tunnel. When the tunnel has been sunk to the bottom, divers descend, and entering the manholes near the extremities remove the end bulk-heads, an operation which is performed with great facility by removing the nuts 18 and bolts 17 and attaching them to lines, by which they are drawn up out of the water, and then separating the radial staves 15ª 15ᵇ and hubs 16ª 16ᵇ, which being of wood are simply passed out through the manholes 15 and allowed to float to the surface, where they are readily recovered for future use. The divers then pass out of the tunnel, close the manhole-covers 14, and the work of laying the aqueduct is completed.

Fig. V shows the tunnel in readiness for the removal of the bulk-heads preparatory to sinking. Fig. VII shows it in course of sinking, and Fig. VI shows it sunk to its final position at the bottom of the water and with the valves and manholes closed as when the tunnel is in regular operation as an aqueduct. The inland end of the aqueduct is of course connected in suitable or required manner with mains or pumps or with another subaqueous aqueduct within a crib or otherwise, as circumstances require.

Having thus described my invention, the following is what I claim as new therein and desire to secure by Letters Patent:

1. The herein-described method of laying subaqueous tunnels, conduits, or tubes, which consists in forming a series of buoyant air-tight sections with removable water-tight bulk-heads, launching said sections on the lake or other body of water in which they are to be laid and floating them out to their proper positions, securing all of said sections together on the surface of the water into a continuous line of tube or tunnel, removing some or all of the intermediate bulk-heads to form a continuous floating conduit, simultaneously admitting water at various points into said conduit, and allowing the whole line of tube to sink at once to the bed of the lake or other water, as explained.

2. The process of submerging buoyant tubes or tunnels in determined position, which consists in attaching buoys to the upper side and admitting water through valves at a number of points simultaneously throughout the length of the tube or tunnel, thus causing it to sink in horizontal position and with the desired side uppermost, as explained.

3. In a buoyant tube or tunnel, the combination of the inlet-valves 10 at bottom, operating-rods 11, extending to the top, bulk-heads 15, closing the ends of the tunnel-sections, and manholes 13 and covers 14, giving ingress thereto through the upper side, as described.

4. In a buoyant tunnel constructed in sections adapted to be coupled together end to end, the combination of the removable sectional bulk-heads 15 near the ends of each tunnel-section, the inlet-valves 10 at bottom, operating-rods 11, extending therefrom to the top, and manholes 13 and covers 14, giving access to the tunnel from the exterior, as described.

5. The bulk-heads constructed of radial staves in two dished or concavo-convex disks converging toward their peripheries and with central grooved or flanged cores and longitudinal straining-bolts for drawing the centers of the said disks together and thus expanding them radially, as explained.

6. The combination of the radial staves united together in the form of a pair of concavo-convex disks, the longitudinal straining-bolt, and the peripheral packing, the whole constructed substantially as herein described and constituting a bulk-head applicable at any desired point within a tube or tunnel and adapted for ready removal from the inside without injury to the parts of said bulk-head.

7. The combination of the grating, clearing-arms, and turbine wheel rotating said arms to exclude fish, weeds, and other solid matter from the intake of a water tube or tunnel, as explained.

ROBERT POWELL.

Witnesses:
OCTAVIUS KNIGHT,
HERVEY S. KNIGHT.